United States Patent
Lotrionte (10) Patent No.: US 7,600,975 B2
(45) Date of Patent: Oct. 13, 2009

(54) TURBINE AND ROTOR THEREFOR

(76) Inventor: Frank Daniel Lotrionte, 70 Dandelion Drive, Rowville, Victoria (AU) 3178

( * ) Notice: Subject to any disclaimer, the term of this patent is extended or adjusted under 35 U.S.C. 154(b) by 425 days.

(21) Appl. No.: 10/598,839

(22) PCT Filed: Mar. 16, 2005

(86) PCT No.: PCT/AU2005/000356

§ 371 (c)(1),
(2), (4) Date: Sep. 13, 2006

(87) PCT Pub. No.: WO2005/090779

PCT Pub. Date: Sep. 29, 2005

(65) Prior Publication Data

US 2007/0248466 A1    Oct. 25, 2007

(30) Foreign Application Priority Data

| Mar. 18, 2004 | (AU) | 2004901396 |
| Mar. 18, 2004 | (AU) | 2004902736 |
| Apr. 5, 2004 | (AU) | 2004902386 |
| Aug. 10, 2004 | (AU) | 2004904453 |
| Sep. 10, 2004 | (AU) | 2004907402 |

(51) Int. Cl.
*B64C 27/46* (2006.01)

(52) U.S. Cl. .................. 416/223 R; 416/228; 416/235; 416/236 R; 416/237; 416/243

(58) Field of Classification Search .................. 416/189, 416/223 R, 228, 235, 236 R, 237, 243
See application file for complete search history.

(56) References Cited

U.S. PATENT DOCUMENTS

| 1,146,121 | A | * | 7/1915 | Annelius | 416/237 |
| 2,582,559 | A | * | 1/1952 | Pearson | 416/167 |
| 3,972,646 | A | * | 8/1976 | Brown et al. | 416/228 |
| 4,368,007 | A | | 1/1983 | Ely | |
| 4,822,246 | A | * | 4/1989 | Hsu | 416/175 |
| 4,893,990 | A | * | 1/1990 | Tomohiro et al. | 416/228 |
| 5,064,345 | A | * | 11/1991 | Kimball | 416/169 A |
| 5,254,876 | A | * | 10/1993 | Hickey | 290/55 |
| 5,895,206 | A | * | 4/1999 | Chuang et al. | 416/189 |
| 6,648,936 | B2 | * | 11/2003 | Higashino et al. | 55/406 |
| D489,446 | S | * | 5/2004 | Hoshina et al. | D23/413 |

FOREIGN PATENT DOCUMENTS

DE    4136956 A1    5/1993

\* cited by examiner

*Primary Examiner*—Igor Kershteyn
(74) *Attorney, Agent, or Firm*—David A. Guerra (57) ABSTRACT

A rotor that consists of a central hub or shaft and a plurality of boot shaped integral blade/vane units that combine a pronounced elongated vane tip extending substantially toward the incoming flow and also the direction of rotation forming a helix or pitch angle to the rotation axis centerline, preferably normal to and joined to the outer frontward extremity of a slightly rearward tilted blade/wing section that is connected by its inner end to the central hub or shaft. The rotor revolves about the rotation axis by incoming gas/fluid flow as most of the fluid flow is encouraged to move substantially outward and rearward as it travels into and past the forwardly projecting vane tips located a substantial distance radially from the axis of rotation. This maximizes the torque developed and transferred to the hub/shaft in a manner that does not greatly inhibit total through flow.

18 Claims, 5 Drawing Sheets

TURBINE AND ROTOR THEREFOR

CROSS-REFERENCE TO RELATED APPLICATIONS

This application is an U.S. national phase application under 35 U.S.C. §371 based upon co-pending International Application No. PCT/AU2005/000356 filed Mar. 16, 2005. Additionally, this U.S. national phase application claims the benefit of priority of co-pending International Application No. PCT/AU2005/000356 filed Mar. 16, 2005; Australian Patent Application AU2004901396 filed Mar. 18, 2004; Australian Patent Application AU2004902736 filed Mar. 18, 2004; Australian Patent Application AU2004902386 filed Apr. 5, 2004; Australian Patent Application AU2004904453 filed Aug. 10, 2004; and Australian Patent Application AU2004907402 filed Sep. 10, 2004. The entire disclosures of the prior applications are incorporated herein by reference. The international application was published Sep. 29, 2005 under Publication No. WO 2005/090779 A1.

BACKGROUND OF THE INVENTION

1. Field of Invention

This invention relates to a turbine and rotor therefore with an axis of rotation substantially parallel to a gas/fluid flow. More particularly, this invention relates to an un-enclosed wind/water turbine or a rotor/impellor housed within a duct extracting or converting energy from/to a moving stream of gas or fluid.

2. Background

On the most part, modern wind turbine rotors are of low solidity and have few long straight blades of "airfoil" section revolving around a central horizontal axis with a large proportion of their blade areas situated within the inner half of their diameters.

The very high tip speed ratios involved in obtaining maximum efficiency can greatly add to noisy operating conditions of these turbines.

The present inventor has realized that the outer one third of any turbine rotor does most of the useful work in converting the kinetic energy from a moving gas/fluid flow into available torque as torque is a function of forcexradius, and also that it is more beneficial in power production to have an increased gas/fluid flow velocity rather than having an increase in the overall size of the turbine rotor, the present invention seeks to situate the majority of the working surface being presented to the gas/fluid flow in this outer region in an effort to achieve a high mechanical efficiency within a design that remains relatively basic, un-encumbered, free-flowing and is does not rely on high tip speed ratios.

The maximum theoretical percentage of energy that can be extracted from a wind flow is 59.3% (the BETZ limit) and this invention has shown University supervised wind tunnel test results supporting of a maximum co-efficient of power above 52%.

BRIEF SUMMARY OF THE INVENTION

This invention seeks to provide a high efficiency output from any wind, water, steam, or gas turbines that have a rotation axis generally parallel to fluid/gas flow by using a rotor design that increases through-flow velocity by having a total flow outlet area formed by the gaps or voids between its blades/vanes much greater than the inlet flow area pre-determined by the maximum rotor diameter and also situating the majority of the working surface area in its outer extremities maximizing total power output for its size, and comprises of a central hub or shaft rotatable about an axis substantially parallel to gas/fluid flow supporting a plurality of integral blade vane units equidistant and radially arranged around the said hub or shaft that each contains within, an integrally formed combination of typically short inner blade or "wing" portions extending substantially outwards from the said hub or shaft, and a substantially frontwardly extending outer "vane" section preferably normal to and joined to the outer, frontward extremity of the said inner portion with the whole vane/blade unit being mounted onto the hub/shaft so as to form a helix or pitch angle between its outer radial extremities and the said hub/shaft axis centre line preferably between 0-6 degrees more than the resultant angle corresponding to the resultant sum of the incoming gas/fluid flow vector and the tangential gas/fluid flow "headwind" component due to rotation and the complete revolving rotor assembly encouraging the flow from being generally parallel to its axis to moving outwardly and rearwardly in an increasing "helical" path preferably exiting in most part past the frontwardly projecting outer vane sections that preferably contain within each, an appropriate angle of incidence at any section along their longitudinal axis, to the resultant fluid/gas vector flowing past that same specific section irrespective of where that section is located or its specific cross section and most preferably that angle of incidence is between 5 and 15 degrees.

As each blade/vane unit is preferably balanced both in weight distribution and twisting (moment) forces due to "lift" from fluid/gas flow, about its own central mounting point centerline normal to the hub or shaft, there is less or no need for an annular stiffening rim at its forwardmost perimeter or midsection connecting it to the other blade/vane units, which simplifies manufacturability whilst retaining the ability to operate at much higher angular velocities as could otherwise have been expected without excessive flexing or failure due to large bending or twist stress levels and this design also retains the possibility of the inclusion of blade/vane articulation to a differing "attack" angle for the purpose of speed limiting or start-up situations.

In the preferable form of this invention, slightly curved slots have been positioned in the outer rearward ends of the outer portions or vanes extending approximately perpendicular to the "resultant" flow in this region resembling in cross-section a slotted wing or "Fowler flap" greatly increasing the lift forces in this said region, enabling the rearmost end of the blade/vane unit to oppose and balance large moment forces formed by the use of extra ordinarily pronounced forward projecting vane portions and if desired, to completely overcome these forces and twist the vane section to a lesser helix or "attack angle" feathering the vane further into the incoming flow enabling maximum speed limiting due to vane/blade flex at a pre-determined flow velocity.

Preferably, this turbine rotor design is a wind turbine, how ever this does not diminish its ability to provide a useful design alternative to any gas, fluid or steam turbines that may be employed in a variety of different situations where the maximum available space may be limited.

BRIEF DESCRIPTION OF THE SEVERAL VIEWS OF THE DRAWINGS

To assist with understanding the invention, reference will now be made to the accompanying drawings which show details of some examples of this invention however it is to be understood that the features illustrated in and described with reference to the drawings are not to be construed as limiting the scope of the invention.

In the drawings:

FIG. 4 "A" depicts a simplified multistage turbine embodiment having a second stage with a differing angle of attack on its blades and direction of rotation than the first stage to maximize resultant lift forces directed into torque at the hub and may have pre-rotor vanes.

FIG. 4 "B" shows a method of achieving blade angle of attack adjustment with a mounting shaft protruding from the lower central mounting line #8 of the blade/vane units which can be articulated by mechanical means built into the hub.

FIG. 4 "C" shows an embodiment without slots that may be more easily manufacturable using the pressed metal or vacuum formed methods that also has an annular rim attached to the forwardmost perimeter of the blade/vane units to increase rigidity.

FIG. 4 "D" depicts a simplified 2 stage fan that may be enclosed in a duct to suit air craft/hovercraft that has a second rotor with a differing rotation direction and blade pitch angle so as to enable the flow produced by rotation to exit at a typically lesser angle without sacrificing pitch length and so actual rearward thrust (that consists of V1 axial plus V 2 axial components).

FIG. 5 shows a face-on view of a blade/vane unit of the preferred embodiment with reference to the design formulae scaled for any given turbine diameter, with:

"D"=maximum rotor diameter

CL max=the maximum lift co-efficient for a blade or wing unit area

Y=the total area of blade/vane rearwards of the central mounting point line#8

X=the total area of blade vane forward of the central mounting point line# 8

A in=area of flow intake (=rotor radius squared×phi.)

A circ=area of flow exiting outwards at perimeter of vanes.

A thru=area of flow exiting at rear of rotor

θ=pitch or attack angle of blade/vane units to the hub/shaft axis

ω=the angle between the vanes leading inner edge #7 to the hub/shaft axis #6.

Ø=the angle between the blade section leading edge to the central line # 8

1=outer vane section

3=inner blade section

6=hub I shaft axis centerline

8=the central line passing through the centroid of areas #10 perpendicular to the hub or shaft axis.

9=the area of junction between the blade/vane and the central hub or shaft

10=the centroid of area about which the total sum areas of the blade and vane sections are considered to be centered upon .

11=the "Resultant" flow vector comprising the sum of the axial flow velocity the radial flow velocity and the tangential flow velocity due to rotation .

10=the incoming flow direction

14=the angle between the vane/blade outer trailing edge and the hub shaft axis .

DETAILED DESCRIPTION OF THE INVENTION

Figure 1:
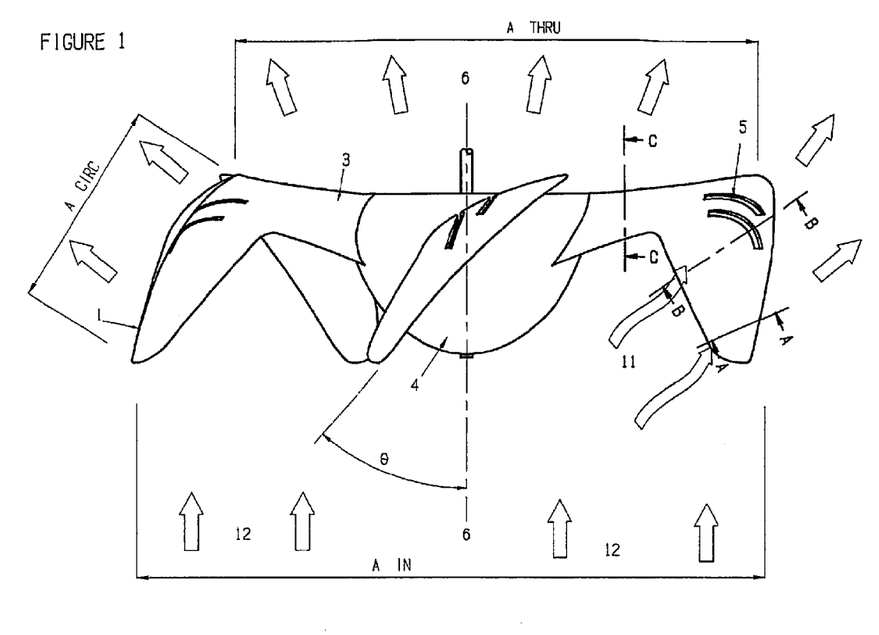
FIG. 1 shows a top view of the preferred embodiment.
Figure 2:
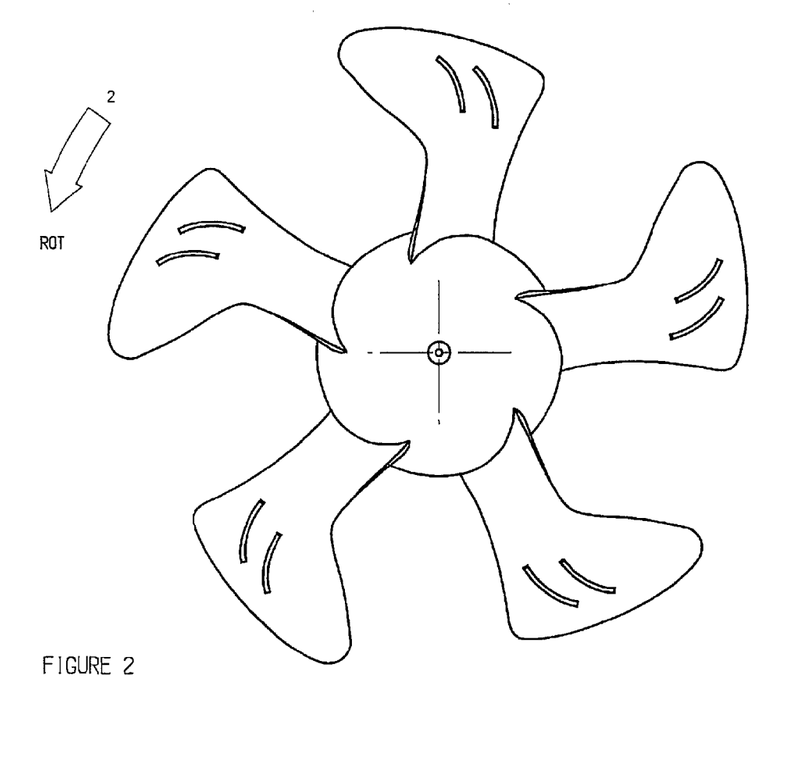
FIG. 2 shows the frontal view of the preferred embodiment, excepting the number of blades and #2 being the direction of rotation in this instance.
Figure 3:
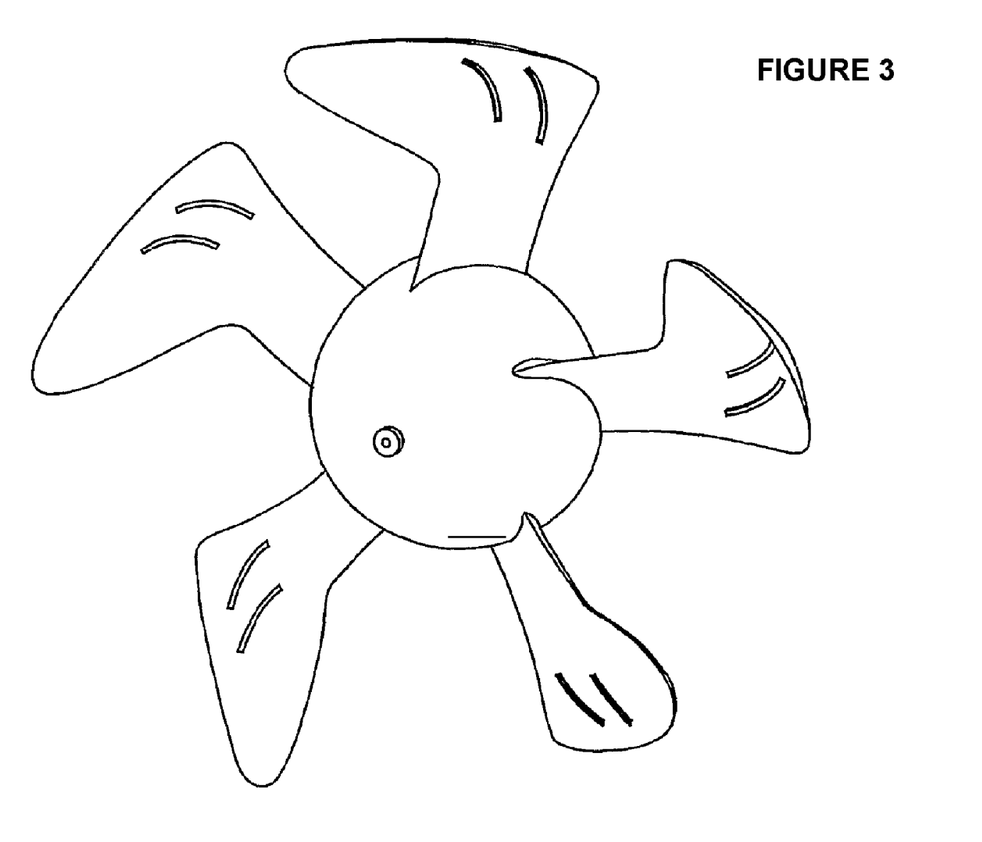
FIG. 3 is an isometric view of the preferred embodiment.
Figure 4:
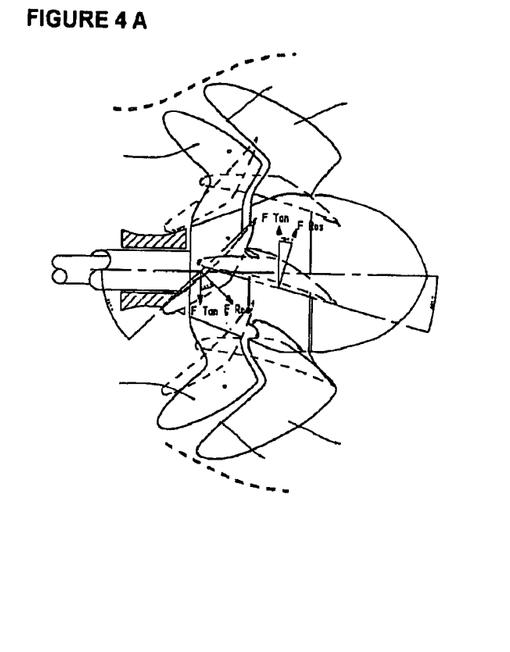

Referring to FIG. 1

A plurality of eqi-spaced integrally formed "crooked" blade/vane units that consist of most preferably an inner airfoil section blade #3 that extends substantially outwards radially from a central hub or shaft #4 at a slight rearward angle, each inner blade having a leading edge also rearwardly sloping between 5 and 60 degrees from normal and a substantially frontwardly protruding vane section #1 integrally formed with and joined to its outer frontward edge and the whole blade/vane unit generally twisted in a helix or pitch angle (9 about the hub/shaft central axis #6 that is preferably parallel to the gas/fluid flow direction #12 so as to maximize the lift or deflection forces obtained from the resultant flow and converted into available torque.

The vane section #1 is preferable of an air foil cross section that diminishes in chord length in proportion to its distance away from the inner blade section#3 to form a curved outer point leading into the oncoming flow.

Figure 5:
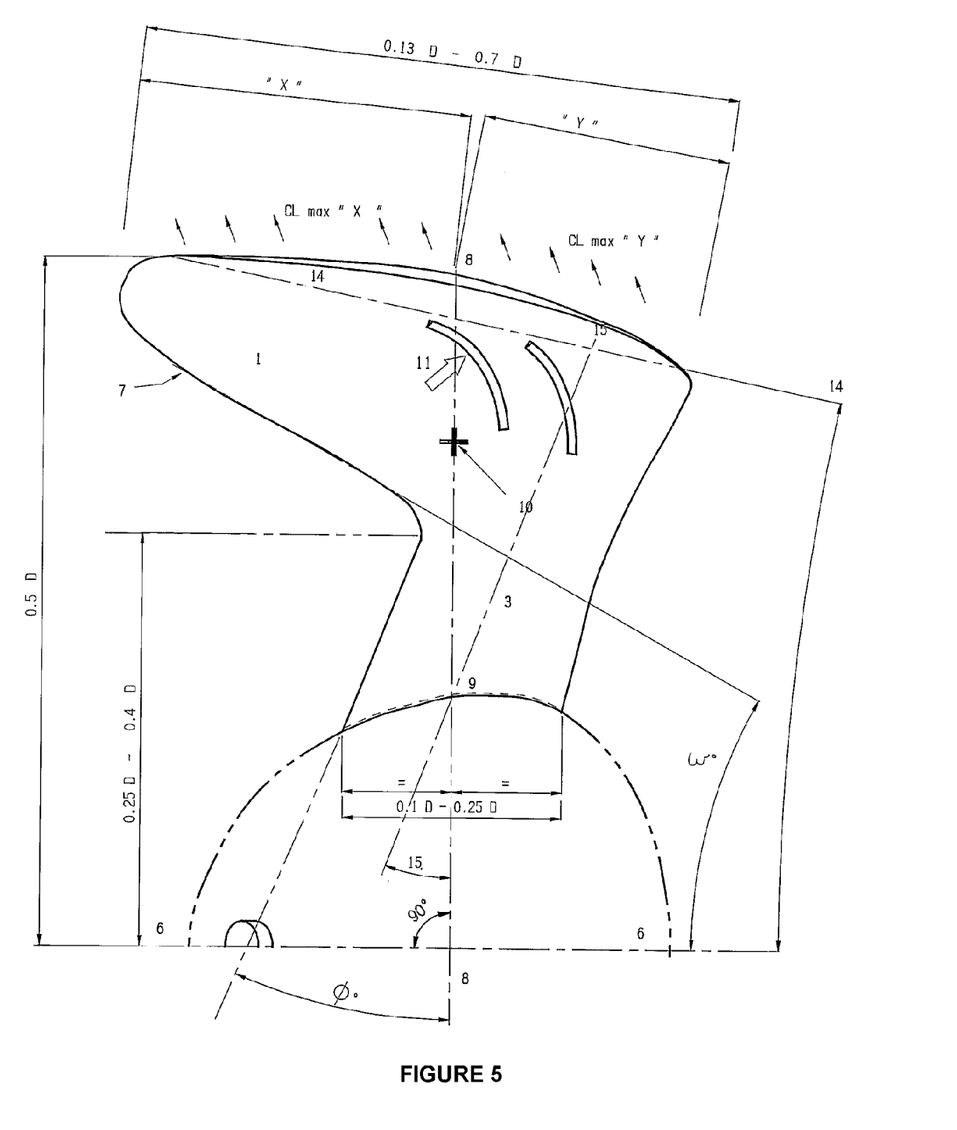
Figure 6:
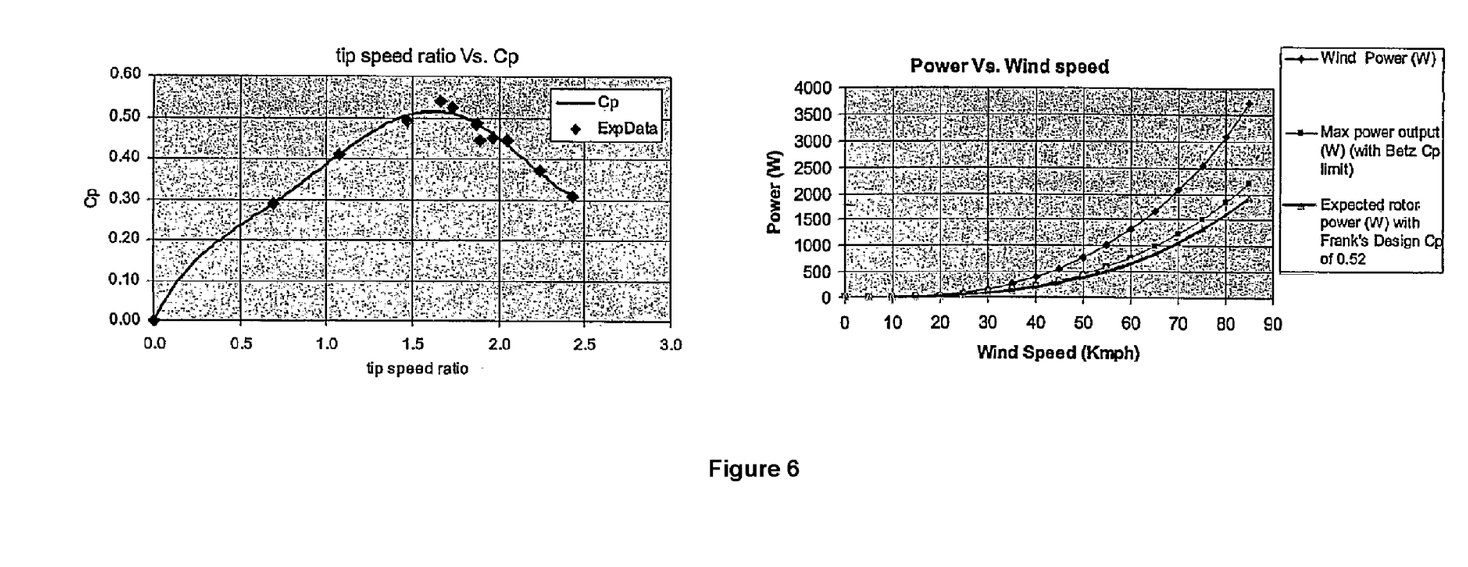
FIG. 6 is the conclusional page to a University supervised wind tunnel test on a 765 mm Dia. rotor.

Referring to FIG. 5

The vanes #1 preferably contain slot/s #5 within their outer rear section that are set approximately normal to the resultant flow #11 past that same said section and may be curved, each slot being quite narrow with a smoothly rounded exit edges so as to direct a portion of the gas/fluid flow through to the rearward face of the vane/blade unit providing an increase of "lift' forces in this region and most preferably forming a secondary "curved" or airfoil cross section in this area and enabling a large increase in the coefficient of lift in this rearmost vane area being useful in balancing a pronounced front section of vane area having a lesser coefficient of lift per unit area which can allow for equilibrium to be maintained due to moment or twisting forces about the central line #8 passing through the total vane/blade area centroid#10 normal to the hub axis #6.

Also, preferably, the total mass forward of the central line #8 (area x-x) is equal to the total mass rear of the central line #8 (area y-y) enabling a fully balanced blade design to be achieved as the central line#8 passes through the centroid of area #10 perpendicular to the hub axis centerline#6.

The central hub #4 could be constructed in a variety of shapes and sizes but preferably has a diameter of between 0.2 and 0.4 of the total rotor diameter, increasing in diameter in a smoothly curved cone shape towards its rear helping to direct flow outwards and rearwards without imparting excessive turbulence and providing a possible housing for blade articulation mechanisms, a generating unit or connection to a suitable output shaft and/or support bearings.

It can be seen from FIG. 1 that the general shape of the complete rotor is designed to impart a fluid or gas flow pattern that has a substantial outward direction as it moves further into and completely through the rotor.

As the total exiting flow area "A thru" plus "A Circ" is much larger than the total inlet flow area "A In" with Volume-in being equal to Volume-out and Volume equal to velocity× area then it follows that from Bernoulli's principle that there must be an increase in velocity inside/frontward of the rotor or a pressure drop outside/rearward of the rotor all of which improving turbine rotor performance over prior art.

All the leading edges are preferably suitably rounded to minimize turbulence and a good surface finish is applied to all sections with the inner blade section being of sufficient strength to adequately transform or direct the sum of the deflection and "lift" forces from the blades, vanes and slots due to fluid/gas flow into torque at the hub or shaft and to be able to withstand centrifugal and bending forces due to the total mass revolving at the maximum rated speed in extreme conditions.

The claims defining the invention are as follows:

1. A rotor system for extracting energy from a fluid stream, said rotor system comprising:
   a central hub rotatable about an axis generally parallel to a fluid flow; and
   a plurality of vane units radially arranged around said hub, each of said vane units having an inner airfoil section and a frontwardly protruding vane section, said inner airfoil section extending substantially outwards radially from said central hub at a slight rearward angle between 5 and 60 degrees from normal, said frontwardly protruding vane section being integrally formed to outer extremities of said inner airfoil section and generally orientated towards the direction of rotation as well as incoming flow, each of said vane units being generally twisted in a pitch angle about said hub that is generally parallel to the resultant flow direction so as to maximize the lift forces obtained from the resultant flow and converting into available torque;
   wherein said frontwardly protruding vane section having a length greater than its width, and a cross section that diminishes in chord length to form a curved outerpoint leading into the resultant fluid flow;
   wherein said vane section substantially set at said pitch angle not increased over the pitch angle of said outer extremities of said inner air foil section that it is integrally formed therewith.

2. The rotor system as set forth in claim 1, wherein said frontwardly protruding vane section has a length at least equal to the length of said inner airfoil section from the same centroid, when measured from said frontwardly protruding vane section's outer tip to a centroid of area of said vane unit.

3. The rotor system as set forth in claim 1, wherein said vane units being able to articulate about their individual mounting point central lines onto said hub to enable speed control.

4. The rotor system as set forth in claim 1, wherein said frontwardly protruding vane section of each vane unit further comprising at least one defined slot within an outer section of said frontwardly protruding vane section, said slot being set approximately normal to the resultant flow past said frontwardly protruding vane section.

5. The rotor system as set forth in claim 4, wherein said slot is curved, and narrow with smoothly rounded exit edges so as to direct a portion of the fluid flow through to a rearward face of said vane unit thereby providing an increase of lift forces in this region.

6. The rotor system as set forth in claim 5, wherein said outer section of said frontwardly protruding vane section forms a secondary airfoil cross section enabling a large increase in the coefficient of lift in said outer section, said secondary airfoil cross section being adapted to balance a front section of said frontwardly protruding vane section area having a lesser coefficient of lift per unit area allowing for equilibrium to be maintained due to moment forces about the central line passing through the centroid area of said vane unit and normal to said hub.

7. The rotor system as set forth in claim 6, wherein said front section of said frontwardly protruding vane section has a total mass equal to the total mass of said outer section.

8. The rotor system as set forth in claim 1 further comprising a generating unit attachable to said hub.

9. The rotor system as set forth in claim 1 further comprising an annular rim attached to the forward most perimeters of said vane units.

10. The rotor system as set forth in claim 1 further comprising a second rotor system adjacent said rotor system, said second rotor system having a hub and a plurality of vane units radially arranged around said hub, said second rotor system having a differing rotation direction and vane pitch angle than said adjacent rotor system.

11. The rotor system as set forth in claim 10, wherein said hub of said rotor system being attachable to a first shaft, and said hub of said second rotor system being attachable to a second shaft.

12. A rotor system comprising:
   a central hub rotatable about an axis generally parallel to a fluid flow; and
   a plurality of vane units radially arranged around said hub, each of said vane units having a blade section extending outwardly from said hub and a vane section frontwardly projecting and integrally formed with radially outer extremities of said blade section;
   wherein said blade section has a rearward inclination between 1 and 60 degrees towards the fluid flow exit direction, said blade section further comprising an airfoil shaped surface facing generally towards the rotation direction;
   wherein said vane section having a length more than its width, and containing a diminishing convex surface generally normal to incoming fluid flow, said vane section being also orientated generally toward the direction of rotation thereby producing said vane unit having a generally L-shaped configuration, said L-shape containing at junction of its inner leading edges a radius of less than vane section length;
   wherein said vane units having a pitch angle, formed between the leading and trailing tips of said vane units and said hub axis, as being slanted frontwardly towards the direction of rotation, said pitch angle being adapted to enable lift forces formed by the fluid flowing past the vane units to revolve said rotor system in the direction of rotation about its central axis of rotation;
   wherein said vane section of each vane unit further comprising at least one defined slot within an outer rear section of said vane section, said slot being set approximately normal to the resultant flow past said vane section.

13. The rotor system as set forth in claim 12, wherein said slot is curved and narrow with smoothly rounded exit edges so as to direct a portion of the fluid flow through to a rearward face of said vane unit thereby providing an increase of lift forces in this region.

14. The rotor system as set forth in claim 13, wherein said outer rear section of said vane section forms a secondary airfoil cross section enabling a large increase in the coefficient of lift in said outer rear section, said secondary airfoil cross section being adapted to balance a front section of said vane section area having a lesser coefficient of lift per unit area allowing for equilibrium to be maintained due to moment forces about the central line passing through the centroid area of said vane unit and normal to said hub, and wherein said front section of said vane section has a total mass equal to the total mass of said outer rear section.

15. The rotor system as set forth in claim 12, wherein said vane units being able to articulate about their individual mounting point central lines onto said hub to enable speed control.

16. The rotor system as set forth in claim 12, wherein said hub has a diameter between 0.05 and 0.75 of the total diameter of said rotor system, and wherein said hub increases in diameter in a smoothly curved cone shape towards its rear to direct fluid flow outwards and rearwards without imparting excessive turbulence.

17. The rotor system as set forth in claim 12 further comprising a second rotor system adjacent said rotor system, said second rotor system having a hub and a plurality of vane units radially arranged around said hub, said second rotor system having a differing rotation direction and vane pitch angle than said adjacent rotor system, wherein said hub of said rotor system being attachable to a first shaft, and said hub of said second rotor system being attachable to a second shaft.

18. A rotor system comprising:
   a central hub rotatable about an axis generally parallel to a fluid flow; and
   a plurality of vane units radially arranged around said hub, each of said vane units having a blade section extending outwardly from said hub and a vane section frontwardly projecting into an incoming fluid flow and integrally formed with outer extremities of said blade section;
   wherein said blade section has a rearward inclination between 1 and 60 degrees towards a fluid flow exit direction, said blade section further comprising an airfoil shaped surface facing generally away from the rotation direction;
   wherein said vane section having a length more than its width, and containing a diminishing convex surface generally normal to the fluid flow and facing the incoming flow at least in part, said vane section being orientated generally toward the direction of rotation as well as towards incoming flow thereby producing said vane unit having a generally L-shaped configuration;
   wherein said vane section contains a pitch angle formed between longitudinal extremities of said vane section and the axis of rotation as being slanted frontwardly towards both incoming flow and the rotation direction, said pitch angle not increased over the corresponding pitch angle of said outer extremities of said blade section that said vane section is integrally formed therewith.

\* \* \* \* \*

UNITED STATES PATENT AND TRADEMARK OFFICE
CERTIFICATE OF CORRECTION

| | | |
|---|---|---|
| PATENT NO. | : 7,600,975 B2 | Page 1 of 1 |
| APPLICATION NO. | : 10/598839 | |
| DATED | : October 13, 2009 | |
| INVENTOR(S) | : Frank Daniel Lotrionte | |

It is certified that error appears in the above-identified patent and that said Letters Patent is hereby corrected as shown below:

Title Page, below Item (54) should read
(76) Inventor: Frank Daniel Lotrionte, Hawthorn, South Australia (AU)

Signed and Sealed this
Second Day of June, 2015

Michelle K. Lee
*Director of the United States Patent and Trademark Office*